June 26, 1962  R. D. RUMSEY  3,040,717
PISTON-RACK ROTARY ACTUATOR
Filed Sept. 8, 1958  2 Sheets-Sheet 2
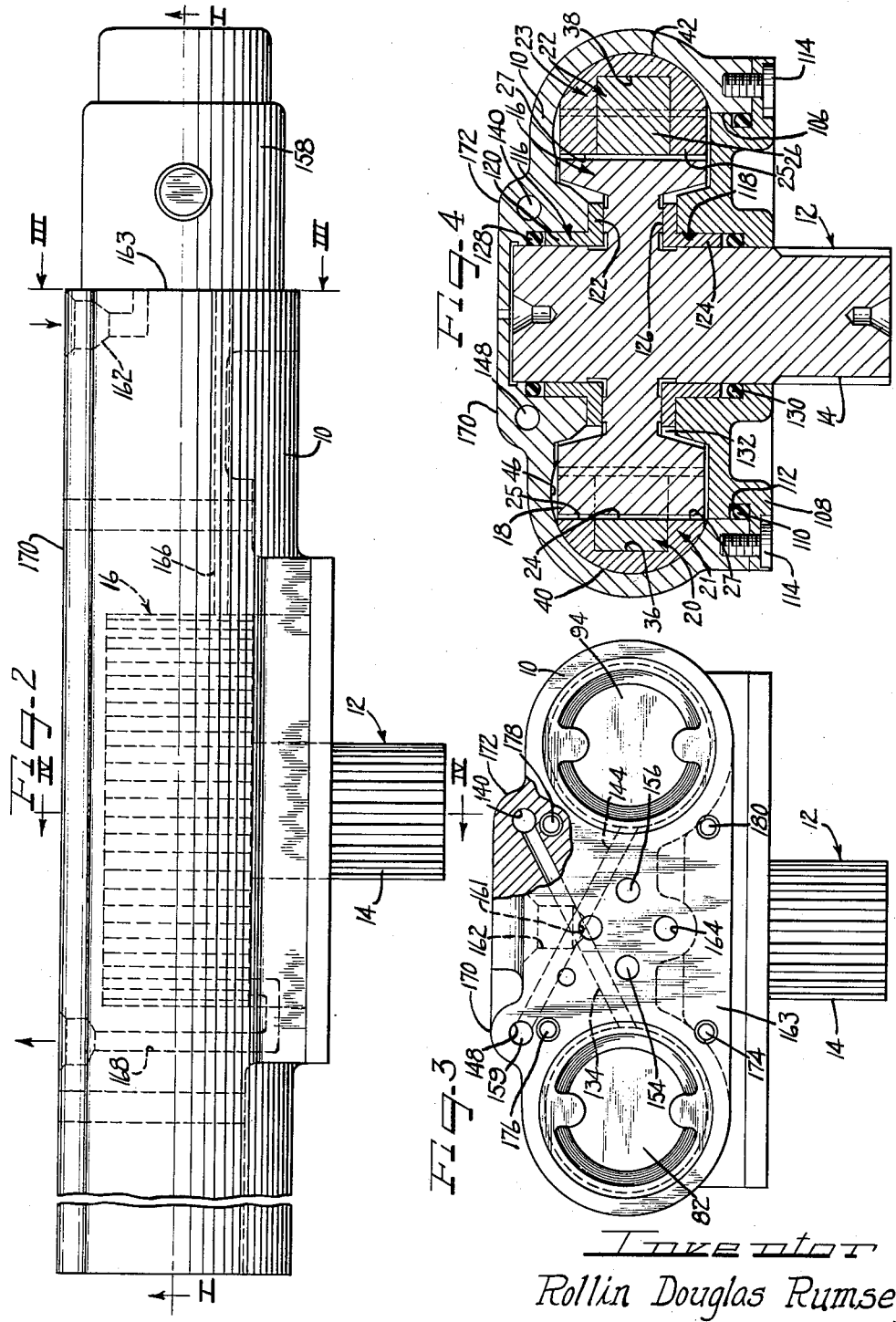
Inventor
Rollin Douglas Rumsey

United States Patent Office 3,040,717
Patented June 26, 1962

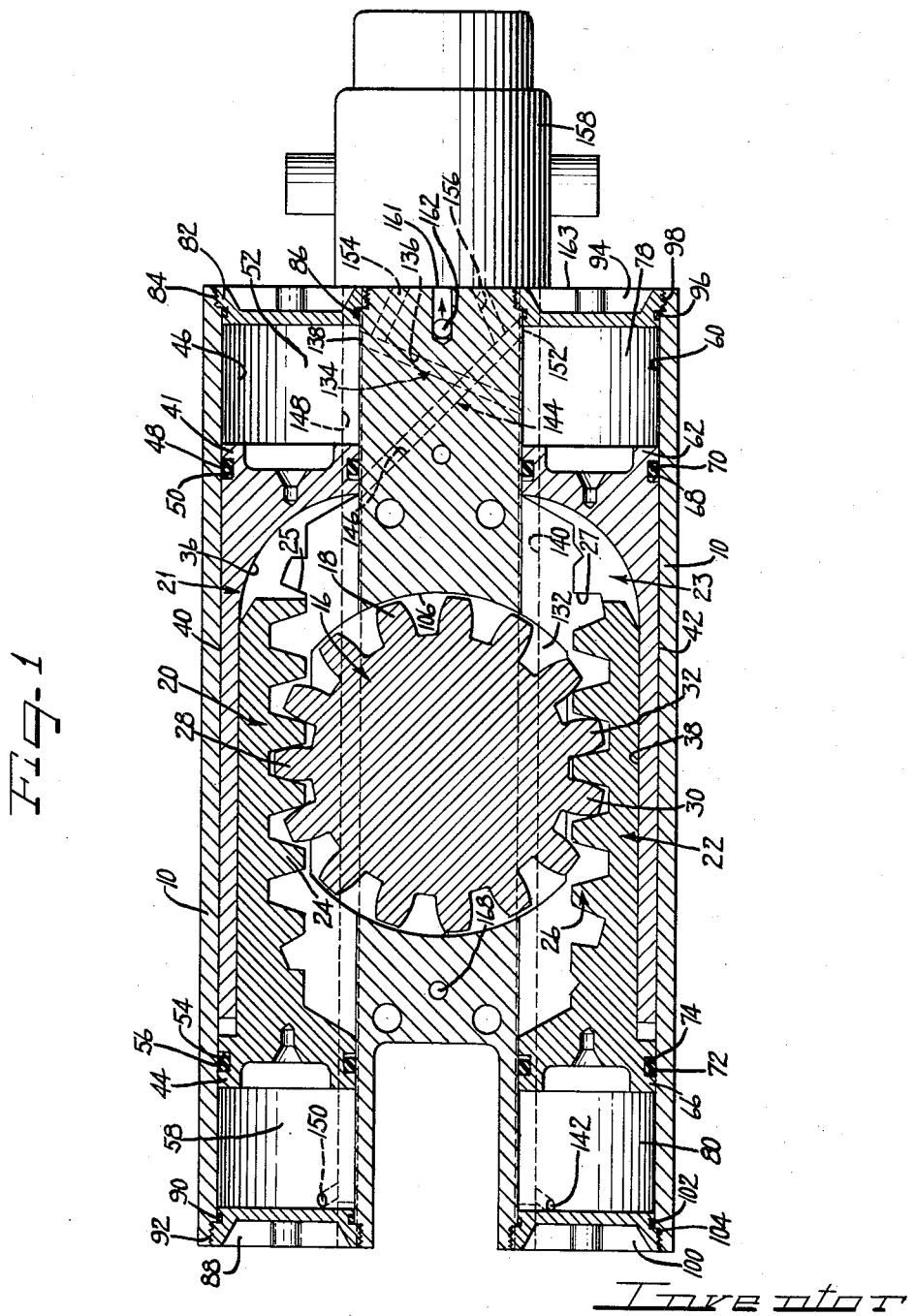

3,040,717
PISTON-RACK ROTARY ACTUATOR
Rollin Douglas Rumsey, Buffalo, N.Y., assignor to Houdaille Industries, Inc., Buffalo, N.Y., a corporation of Michigan
Filed Sept. 8, 1958, Ser. No. 759,805
8 Claims. (Cl. 121—120)

The present invention relates to an improved rotary actuator, and more particularly to a rotary actuator driven by reciprocating hydraulic pistons connected to the actuator by opposed racks.

The actuator of the present invention is particularly adapted for use in high performance servo-mechanism systems, such as are employed on aircraft missiles and precision machines.

The preferred form of the invention shown may embody a shaft driven by a rotary gear, which is engaged by diametrically opposed pairs of rack parts. Each pair of racks has teeth formed in split parts to eliminate backlash with respect to the gear. The gear employs an odd number of teeth to minimize gear load pulsation. At one end of each of the racks are pistons which are hydraulically operated to simultaneously apply an equal linear force to the racks. Each pair of the racks and the pistons at the ends of each pair of racks are carried in separate cylinders formed in a unitary housing. The housing has lateral bores extending completely therethrough to accommodate each of the racks and pistons, and the ends of the cylinders are sealed by plugs, so as to form a pressure chamber at each end of each of the racks facing the pistons. The unitary housing is bored at right angles to provide a chamber for the gear which intercepts the cylindrical bores, so that leakage of hydraulic fluid will flow into the gear chamber. The gear chamber is closed by a plate through which sealingly extends a drive shaft. Flow passageways or conduits extend through the integral housing, connecting to one end of the cylindrical bores with the tail end of the opposing cylindrical bore, so that pressurized hydraulic fluid will simultaneously act on pistons connected to racks on opposites sides of the gear. A four-way valve is secured at the end of the housing to direct pressurized fluid into one of the passageways while venting the other passageway. The passageways are formed in a ridge along the top of the housing, and a pressure passageway leads into the housing to communicate with the valve. The valve discharges vented fluid through the housing into the gear chamber to lubricate the gear and racks, and a relief passageway leads through the housing from the gear chamber for the return fluid and fluid leakage.

It is an object of the invention to provide an improved mechanism of the foregoing description for high performance servo-use, such as is required in aircraft, missiles and precision machines.

Another more specific object of the invention is to provide an actuator mechanism employing gears wherein zero back lash is present, and where pairs of racks are used acting on the same gear teeth for movement in opposite directions.

Another object is to provide a servo-mechanism wherein rotational motion is obtained which is proportional to hydraulic flow.

A further object is to provide a hydraulic actuator wherein the moving external seals are subjected only to a drain pressure.

A further object is to provide a hydraulic actuator having zero internal leakage and obtaining positive positioning of the load.

A further object is to provide an actuator mechanism obtaining balanced hydraulic forces and minimizing bearing loads.

Another object is to provide an actuator which obtains low internal friction.

A further object is to provide an improved, hydraulic, mechanical actuator wherein the manufacturing operations are simplified for low cost, and wherein the mechanism may be constructed by employing through-boring procedures.

Another object is to provide a rotary actuator having balanced construction and obtaining low weight for use in aircraft and missiles, wherein weight is an important factor.

A still further object is to provide a rotary actuator which utilizes all circular seals and wherein metal seals may be provided for high-temperature service.

Other objects and advantages will become more apparent with the disclosure and teachings of the principles of the invention in the specification, claims and drawings, in which:

FIGURE 1 is a horizontal sectional view taken through an actuator embodying the principles of the present invention, and shown as taken along line I—I of FIGURE 2;

FIGURE 2 is a side elevational view of the rotary actuator;

FIGURE 3 is a vertical sectional view taken along line III—III of FIGURE 2, and particularly illustrating the flow passageway arrangement for the hydraulic fluid control valve; and FIG. 4 is a vertical sectional view taken along line IV—IV of FIGURE 2, which extends through the axis of the rotary gear.

As shown in the drawings:

The actuator is shown in the drawings having a housing 10 which is preferably formed of an integral section of material, such as a casting, which is machined and bored in the manner which will be described. Power is derived from the actuator from a power output shaft 12. The shaft is shown as having a splined outer surface 14 for purposes of connecting a driven element.

As illustrated in FIGURE 4, the power output shaft 12 is connected to, or integral with a central gear 16. Arranged peripherally around the outer surface of the gear are gear teeth, such as illustrated at 18.

The gear 16 is driven in rotation by diametrically opposed pairs of racks. One pair on one side of the gear includes rack 20 and rack 21 having teeth 24 and 25 in driving mesh with the teeth 18 of the gear, and engaging the same gear teeth. Another pair of racks 22 and 23 having teeth 26 and 27 mesh with the same gear teeth on the other side of the gear.

To drive the gear, the rack members are reciprocated in a direction opposite to each other, and move in a common plane, so as to drive the gear 16 in rotation. It will be noted that the gear 16 has an odd number of teeth. Thus, as illustrated in FIGURE 1, and also in FIGURE 4, the engagement between the pair of racks 20 and 21 and the gear 16 will be one-half tooth out of phase relative to the engagement between the pair of racks 22 and 23 and the gear 16. This is illustrated by the fact that tooth 28 of the gear is in full mesh with racks 20 and 21, while on the diametrically opposed side of the gear, teeth 30 and 32, respectively, are entering and leaving full mesh to straddle teeth of the racks 22 and 23. The racks are constructed and sized so that they are held firmly in mesh with the gear. This arrangement of pairs of racks actuated in opposite directions prevents the occurrence of any back lash.

Each pair of racks is similarly constructed. Rack 21, as shown in FIGURES 1 and 4, has a slot 36 which is rectangular in cross-sectional appearance and extends axially along its center to receive the rack 20. Thus, the teeth 25 of the rack 21 are laterally separated with the gap between them completed by the teeth 24 of the rack 20. The combined parts of the teeth 25 and the center teeth 24 complete a full lateral tooth across the pair of racks. The racks are, of course, constructed to move individually so that the teeth 25 and 24 can move axially with respect to each other to remove any back lash.

The rack 21 has a rounded back 40 which slides in the cylindrical surface of the bore 46 in the housing 10. The rack 20 is contained in the slot 36 of the rack 21, and the racks will reciprocate together.

The rack 23 is provided with a rectangular shaped axially extending slot 38, as shown in FIGURES 1 and 4. The rack 22 is located in this slot. Thus, the teeth 27 of the rack 23 are formed of laterally separated parts with the teeth 26 of the rack 22 being located between the parts 27 and completing a laterally extending tooth. The teeth 27 and 26, of course, are free to shift axially with respect to each other, thereby eliminating any back lash relative to the gear. The back of the rack 23 is rounded as shown at 42, to slide in the bore 60 in the housing.

The rack 21 carries an integral piston 41 at its head end which is cylindrically shaped to be slidable in the bore 46, which extends axially through the housing. The piston 41 carries an annular groove 48 in which is located a piston ring 50 to prevent the leakage of fluid in the chamber 52 past the piston. The chamber 52 will hereinafter be referred to as being at the head end of the housing, and is defined between the piston 41 and the circular closure cap 82, which closes the head end of the bore 46. For this purpose, the cap has threads 84 threadably received by mating threads in the bore, and the cap is provided with a seal 86 to prevent the leakage of fluid from the end of the bore.

The rack 20 carries at its end an integral piston 44 which is circular in shape to slide in the bore 46. The piston has an annular groove 54 which carries a piston ring 56 to prevent the leakage of fluid from a chamber 58 formed in the tail end of the bore. The chamber 58 is closed by a circular cap 88 which is provided with a ring seal 90 preventing the leakage of fluid, and is provided with threads 92 to be threadingly received by the end of the bore 46.

The other side of the housing has an axial bore 60 which extends parallel to the bore 46 and is closed at its ends to form chambers and to slidingly retain the pistons at the ends of the rack 22 and 23.

The rack 23 carries at its head end an integral circular piston 62 which is slidably located in the bore 60. The piston has an annular groove 68 carrying a circular sealing ring 70. A chamber is defined at the end of the piston 62 closed by a circular end cap 94 having a circular seal 96 closing the chamber 78. The cap has threads 98 to be threaded into the end of the bore 60.

The rack 22 carries an integral circular piston 66 at its end which is slidably located in the bore 60 at its tail end. The piston has an annular groove 72 carrying a circular sealing ring 74. A chamber 80 is formed at the tail end of the bore between the piston 66 and a circular end closing cap 100. The cap has a circular sealing ring 102 and is provided with threads 104 to be threaded into the tail end of the bore 60.

The gear 16 is supported for rotational movement by annular bearing rings 116 and 118. Each of the bearing rings, such as 116, has an annular collar portion 120 with an outwardly extending flange 122 thereon, with the collar section supporting the gear against radial thrust and the flange supporting the gear against axial thrust. The ring 118 is identical in construction having an annular collar portion 124 and a flange portion 126.

A ring seal 128 is provided to encircle the upper end of the shaft 12, as shown in FIGURE 4, and another ring seal 130 is provided to encircle the shaft 12 at its lower end to prevent the leakage of fluid from the gear chamber, such as shown generally at 132 and which is formed by the cylindrical bore 106 which intersects the cylindrical bores 46 and 60.

The bore 106 receives a cap 108 which supports the bearing ring 118. The cap is sealed relative to the bore 106 by an annular sealing ring 110 in a groove 112 on the cap. The cap is held in place by screws 114 which pass through holes in a flange on the cap and thread into holes in the housing 10.

Leakage past the pistons will pass into the low pressure gear chamber 132, and the gear chamber will be maintained at substantially atmospheric pressure. Thus, all of the dynamic pressure seals will be internal seals. Furthermore, the gear chamber 132 is used as a return chamber for the operating fluid, and the fluid serves to lubricate the gear and racks.

Chambers at opposite ends of the racks on opposite sides of the gear are interconnected so that hydraulic fluid pressure will be simultaneously applied on the first racks of each pair on opposite sides of the gear for rotation of the gear in one direction and on the other racks of each pair for rotation of the gear in the other direction.

A first pressure conduit 134, FIGURE 1, connects the pressure chamber 52 operating at the piston 41 of the rack 21 with the pressure chamber 80 operating piston 66 at the end of the second rack 22. This pressure conduit has a first cross portion 136, which extends through the interior of the housing and opens into the head end pressure chamber 52 at 138. The cross portion 136 connects with an elongated portion 140, which leads to the tail end of the housing and opens into the pressure chamber 80 at 142. The portion 140 of the housing is formed by drilling a hole completely through the housing, and plugging both ends of the hole or passageway.

A second pressure conduit 144 is provided which connects the pressure chamber 78 for the piston 62 of the rack 23 with the pressure chamber 58 for piston 44 of the rack 20. This conduit 144 has a cross portion 146 which communicates with an elongated passage 148 extending completely through the housing and plugged at its end. The portion 148 opens into the pressure chamber 58 at 150. The two cross portions 136 and 146 for the pressure conduits 134 and 144 can each be drilled from the end of the housing, as shown in FIGURE 1. The portion 146 will open into the pressure chamber 78 at 152.

When one of the pressure conduits 134 or 144 is pressurized, the other conduit is vented. For purposes of pressurizing one conduit and venting the other, the first conduit 134 is provided with a small lateral passageway 154 which opens at the location illustrated in FIGURES 1 and 3. The other pressure conduit 144 is provided with a similar small lateral passageway 156, which opens from the end of the housing at the location shown in FIGURE 3.

FIGURE 3 illustrates the end of the housing with a valve 158 removed. FIGURE 3 also illustrates the ends of the bore passageways 140 and 148, and the ends of a plug 159 which is used to close the passageway 148.

The valve 158 is of the type which has been known to the art as a four-way valve, and operates to direct pressurized fluid to either the passageways 154 or 156, and to vent the other from a pressurized supply passageway, and to a relief passageway.

Pressurized fluid is admitted to the valve of 158 through a port 161 opening from the end face 163 of the housing. Pressurized fluid is supplied through the port 161 from the passageway 162 which leads into the top of the housing, as shown in FIGURE 2 and to which a pressure supply line is connected. Fluid is vented from the valve through a port 164. The port 164 leads to a passageway 166, FIGURES 1, 2, and 3 which opens into the gear chamber 132.

As previously stated, the gear chambers are maintained at substantially atmospheric pressure, and drain through a passageway 168, which leads upwardly through the housing to connect to a line leading back to a reservoir or the like, supplying a pressure pump for operating the mechanism.

The four-way valve 158 may be of any desired type, and may be electrically or mechanically operated to direct pressurized fluid from the passageway 162 to either of the two passageways 154 or 156, and to vent the other passageway down through the port 164.

The housing is provided with elongated, raised portions along the top to accommodate the passageways 140 and 148, as shown in FIGURES 3 and 4 with the raised portions indicated at 170 and 172. Thus the passageways are formed integrally within the housing 10. The end face 163 of the housing contains four threaded holes 174, 176, 178 and 180 for receiving screws for mounting the control valve 158.

In operation, pressurized fluid is directed down through the passageway 162, and the valve 158 is controlled to direct pressurized fluid through either of the ports 154 or 156, FIGURE 3. As shown in FIGURE 1, pressurized fluid will flow into one of the head end chambers 52 or 78, and into one of the tail end chambers 58 or 80 on the opposite side of the housing. The other two opposite head and tail chambers will be vented, and the flow of fluid relieved through the control valve 158 which directs the flow through the passageway 166 to the gear chamber 132 whereupon it leaves through a passageway 168. The pressurized fluid will cause the opposed racks 20 and 23 to tend to rotate the gear 16 in one direction or will cause the opposed racks 21 and 22 to tend to move the gear in the other direction, thus tending to drive the shaft 12. With positive control of the fluid and the absence of back lash, a positive accurate balanced control of the position of the gear can be obtained.

Thus, it will be seen that I have provided an improved hydraulic mechanical actuator which meets the objectives and advantages hereinbefore set forth. The mechanism is capable of obtaining accurate rotation in proportion to hydraulic flow, such as may be used in a servo-mechanism requiring accurate and controlled output rotation. The external moving seals of the mechanism are subjected only to drain pressure, and drain internally, thereby obtaining zero leakage. In locked positions of the mechanism when flow passageways are closed, there is zero internal leakage or balance leakage, and hence, positive positioning of the load is obtainable.

The arrangement of the gear and the opposed split racks obtain balanced forces, thereby minimizing bearing loads. The internal friction is at a minimum, and the device is capable of construction with a minimum of weight in view of the balanced construction. The teeth of different racks operating on the same gear tooth eliminates back lash. The odd number of teeth on the gear minimizes load pulsation, and the arrangement of the seals permits use of seals formed of metal for use in high-temperature service. In some instances, the seals are preferably formed of ceramic. In other instances, all of the seals, i.e. 50, 56, 70, 74, 86, 90, 96, 102, 110, 128, and 130, are made of metal to withstand high temperatures.

Since these are each circular, these materials are possible and practical.

I have, in the drawings and specification, presented a detailed disclosure of the preferred embodiments of my invention, and it is to be understood that I do not intend to limit the invention to the specific form disclosed, but intend to cover all modifications, changes and alternative constructions and methods falling within the scope of the principles taught by my invention.

I claim as my invention:

1. A hydraulic and mechanical actuator for translating reciprocating rotary forces comprising in combination a rotary gear having teeth extending from the periphery, first and second rack members extending at right angles to the edges of the gear and having teeth in mesh with the gear teeth, third and fourth rack members extending at right angles to the axis of the gear and having teeth in mesh with the gear teeth at a location diametrically opposed from the first and second racks, said gear having an odd number of teeth whereby the racks will simultaneously engage different portions of the gear teeth to minimize the gear load pulsations, a unitary housing for said gear and racks having a first and a second cylindrical bore extending therethrough to house said racks, first individual pistons each secured to a separate rack of said first and second racks allowing relative motion between racks and slidably located at the head and tail end of said first cylindrical bore, second individual pistons each connected to a separate rack of said third and fourth racks allowing relative motion between racks and slidably located at the head and tail end of said second bore, plug means closing the ends of each of said bores, a circular opening in said housing accommodating the gear therein communicating with said first and second cylindrical bores whereby any leakage past the pistons will flow into the gear chamber, a cap for said circular opening for said gear closing the gear chamber and attached to said housing, internal passageways extending through said housing with a first passageway communicating with the chamber formed at the head end of the first bore and the chamber at the tail end of the second bore, a second passageway communicating with the chamber at the head end of the second bore and with the chamber at the tail end of the first bore, a valve secured to said housing and connected to selectively direct pressurized fluid to one of said passageways and to vent the other of said passageways to said gear chamber whereby back lash between the rack members and gear will not occur as the gear rotation is reversed with operation of the valve changing the passageway that is pressurized, a fluid pressure conduit connected to said valve for supplying pressurized fluid to operate the pistons and racks, a relief passageway leading from said gear chamber for the return of leakage fluid and fluid directed to the gear chamber from said valve, and power shaft connected to said gear.

2. An actuator for the transmission of power comprising a centrally located gear having teeth extending for the full periphery, a power transmitting shaft member connected for rotation with said gear, a first rack member positioned to extend tangentially to said gear and in power transmitting mesh therewith, a second rack member positioned to extend tangentially at a location diametrically opposed from said first rack and in power transmitting mesh with the gear, said gear having an odd number of teeth whereby the opposed racks will simultaneously engage different parts of gear teeth minimizing gear load pulsation, and means operatively associated with said rack members for power transmission with movement of said racks.

3. A hydraulic actuator for the mechanical transmission of power wherein pressure leakage is solely internal comprising a centrally located gear having teeth, a power transmitting shaft member connected for rotation with said gear, a first rack member positioned to extend tangentially to said gear and in power transmitting mesh therewith, a second rack member positioned to extend tangentially and in power transmitting mesh with the gear, a piston secured to said first rack member, a piston secured to said second rack member, a sealed housing providing piston chambers slidably housing said pistons and a communicating gear chamber for said gear and having external openings only for said power shaft, valve means selectively communicating said piston chambers with a fluid pressure or the gear chamber to move the racks and whereby pressure leakage past the pistons will flow to the gear chamber, and a drain passageway from said gear chamber maintaining it at low pressure and removing leakage fluid.

4. A hydraulic actuator for use as a servo-motor or the like comprising a rotary output gear having gear teeth, means rotatably supporting the gear, a first pair of racks having teeth located axially adjacent each other and in mesh with the gear teeth, a second pair of racks diametrically opposed to said first pair and having teeth located axially adjacent each other and in mesh with the gear teeth, each of said pairs comprising first and second racks with the teeth of each of the first racks being at the same axial position relative to the output gear, and the teeth of each of the second racks being at the same axial position relative to the output gear, so that the forces of the racks act in the same planes in either direction and there is an absence of a bending moment on said gear supporting means, and means for selectively applying a first force simultaneously to the first rack of each of said pairs to rotate the gear in a first direction or a second force to the second rack of each of said pairs to rotate the gear in the other direction whereby the racks will remain in contact with the gear teeth as the direction of rotation of the gear is reversed to prevent back lash.

5. A hydraulic actuator for use as a servo-motor or the like comprising a rotary output gear having gear teeth, a housing enclosing said gear, means rotatably supporting the gear in the housing, a first pair of racks having gear teeth located axially adjacent each other and in mesh with the gear teeth, a second pair of racks diametrically opposed to said first pair and having teeth axially adjacent each other and in mesh with the gear teeth, each of said pairs comprising first and second racks with the teeth of each of the first racks being at the same axial position relative to the output gear, and the teeth of each of the second racks being at the same axial position relative to the output gear, so that the forces of the racks act in the same planes in either direction and there is an absence of a bending moment on said gear supporting means, pistons connected to individually drive said racks, a first bore through said housing containing the pistons for said first pair of racks, a second bore through said housing containing the pistons for said second pair of racks and substantially parallel to said first bore, means sealing the ends of said bores defining pressure chambers at the ends of each of said pistons, and means for selectively pressurizing diametrically opposed chambers of said first and second bores to drive the first rack of each of said pairs to rotate the gear in a first direction or to pressurize the other diametrically opposed chambers of said first and second bores to drive the second rack of each of said pairs to rotate the gear in the opposite direction whereby the racks will remain in contact with the driving surfaces of the gear teeth to prevent back lash.

6. A hydraulic actuator for use as a servo-motor or the like comprising a rotary output gear having gear teeth, a housing enclosing said gear, a shaft supporting said gear and extending from the housing, said shaft being the sole moving part extending from said housing, a seal of non-yielding heat resistant material between said shaft and said housing, a first pair of racks having gear teeth located axially adjacent each other and in mesh with the gear teeth, a second pair of racks diametrically opposed to said first pair having teeth axially adjacent each other and in mesh with the gear teeth, each of said pairs comprising first and second racks with the teeth of each of the first racks being at the same axial position relative to the output gear, and the teeth of each of the second racks being at the same axial position relative to the output gear, so that the forces of the racks act in the same planes at either direction and there is an absence of a bending moment on said shaft, pistons connected to individually drive said racks, a first bore through said housing containing the pistons for said first pair of racks, a second bore through said housing containing the pistons for said second pair of racks and substantially parallel to said first bore, means sealing the ends of said bores defining pressure chambers at the ends of each of said pistons, and means for selectively pressurizing diametrically opposed chambers of said first and second bores to drive the first rack of each of said pairs to rotate the gear in a first direction or to pressurize the other diametrically opposed chambers of said first and second bores to drive the second rack of each of said pairs to rotate the gear in the opposite direction whereby the racks will remain in contact with the driving surfaces of the gear teeth to prevent back lash.

7. A hydraulic actuator for use as a servo-motor or the like comprising a rotary output gear having gear teeth, a housing enclosing said gear, a shaft supporting said gear and extending from the housing, said shaft being the sole moving part extending from said housing, a rotary seal of metal between said shaft and said housing, a first pair of racks having gear teeth located axially adjacent each other and in mesh with the gear teeth, a second pair of racks diametrically opposed to said first pair having teeth axially adjacent each other and in mesh with the gear teeth, each of said pairs comprising first and second racks with the teeth of each of the first racks being at the same axial position relative to the output gear, and the teeth of each of the second racks being at the same axial position relative to the output gear, so that the forces of the racks act in the same planes at either direction and there is an absence of a bending moment on said shaft, pistons connected to individually drive said racks, a first bore through said housing containing the piston for said first pair of racks, a second bore through said housing containing the pistons for said second pair of racks and substantially parallel to said first bore, means sealing the ends of said bores defining pressure chambers at the ends of each of said pistons, and means for selectively pressurizing diametrically opposed chambers of said first and second bores to drive the first rack of each of said pairs to rotate the gear in a first direction or to pressurize the other diametrically opposed chambers of said first and second bores to drive the second rack of each of said pairs to rotate the gear in the opposite direction whereby the racks will remain in contact with the driving surfaces of the gear teeth to prevent back lash.

8. A hydraulic actuator for use as a servo-motor or the like comprising a rotary output gear having gear teeth, a housing enclosing said gear, a shaft supporting said gear and extending from the housing, said shaft being the sole moving part extending from said housing, a rotary seal of ceramic between said shaft and said housing, a first pair of racks having gear teeth located axially adjacent each other and in mesh with the gear teeth, a second pair of racks diametrically opposed to said first pair and having teeth axially adjacent each other and in mesh with the gear teeth, each of said pairs comprising first and second racks with the teeth of each of the first racks being at the same axial position relative to the output gear and the teeth of each of the second racks being at the same axial position relative to the output gear so that the forces of the racks act in the same planes at either direction and there is an absence of a bending moment on said shaft, pistons connected to individually drive said racks, a first bore through said housing containing the pistons for said first pair of racks, a second bore through said housing containing the pistons for said second pair of racks and substantially parallel to said first bore, means sealing the ends of said bores defining pressure chambers at the ends of each of said pistons, and means for selectively pressurizing diametrically opposed chambers of said first and second bores to drive the first rack of each of said pairs to rotate the gear in a first direction or to pressurize the other diametrically opposed chambers of said first and second bores to drive the second rack of each of said pairs to rotate the gear in the opposite direction whereby the racks will remain in contact with the driving surfaces of the gear teeth to prevent back lash.

References Cited in the file of this patent

UNITED STATES PATENTS

| | | |
|---|---|---|
| 1,694,188 | Lewis | Dec. 4, 1928 |
| 2,548,603 | Hallstrand | Apr. 10, 1951 |
| 2,681,581 | Pearson | June 22, 1954 |
| 2,844,127 | Steiner | July 22, 1958 |

FOREIGN PATENTS

| | | |
|---|---|---|
| 840,655 | Germany | June 3, 1952 |